United States Patent [19]

Shenk

[11] Patent Number: 4,535,404
[45] Date of Patent: Aug. 13, 1985

[54] METHOD AND APPARATUS FOR ADDRESSING A PERIPHERAL INTERFACE BY MAPPING INTO MEMORY ADDRESS SPACE

[75] Inventor: William H. Shenk, Acton, Mass.

[73] Assignee: Honeywell Information Systems Inc., Waltham, Mass.

[21] Appl. No.: 373,062

[22] Filed: Apr. 29, 1982

[51] Int. Cl.³ .............................................. G06F 3/04
[52] U.S. Cl. ..................................................... 364/200
[58] Field of Search ... 364/200 MS File, 900 MS File

[56] References Cited

U.S. PATENT DOCUMENTS

| 4,124,888 | 11/1978 | Washburn | 364/200 |
| 4,131,945 | 12/1978 | Richardson et al. | 364/200 |
| 4,156,932 | 5/1979 | Robinson et al. | 364/200 |
| 4,365,296 | 12/1982 | Ulmer | 364/200 |
| 4,456,970 | 6/1984 | Catiller et al. | 364/900 |

OTHER PUBLICATIONS

Digital *pdp11 Handbook*, copyrighted 1969, (pp. 46 to 51).

Intel, *Component Data Catalog*, 1979, (pp. 9-54 to 9-69).
MC68120/MC68121, Intelligent Peripheral Controller User's Manual, Motorola Inc., pp. 1-1 to 1-12, 1981.

*Primary Examiner*—Thomas M. Heckler
*Assistant Examiner*—Daniel K. Dorsey
*Attorney, Agent, or Firm*—William A. Linnell; Nicholas Prasinos

[57] ABSTRACT

A method and apparatus for addressing a peripheral interface by mapping into the memory address space of a processor contained in a peripheral controller. The processor in the peripheral controller initializes interface logic within the peripheral controller and in the host system peripheral interface logic to which the peripheral controller is attached to either transmit or receive a block of data. Once initialized, units of data are transmitted across the interface between the peripheral controller and host system using a strobe and acknowledge signal to indicate when data can be taken or placed on data lines. The processor is placed in a wait state as each unit of data is transferred and a watch dog timer is provided to detect any transfer that is not completed within the normal response time of the interface.

13 Claims, 3 Drawing Figures

METHOD AND APPARATUS FOR ADDRESSING A PERIPHERAL INTERFACE BY MAPPING INTO MEMORY ADDRESS SPACE

BACKGROUND OF THE INVENTION

1. Field of the Invention

This invention relates to data processing systems; and more specifically to a method of transferring data across an interface between units comprising a data processing system.

2. Description of the Prior Art

In the prior art, it is known for data processing systems to have a special class of program instructions to deal with input/output (I/O) operations from or to peripheral devices attached to the system. More recently, it is known to perform I/O operations using normal program instructions that are used to reference memory within the data processing system. This technique, which is known as memory mapped I/O, allows peripheral operations to be performed by setting aside a predetermined amount of the memory address space and assigning addresses within this address space to device registers associated with peripheral devices. Programmed operations on these device registers, such as transferring information into or out of them or manipulating data within them, can then be performed by normal memory reference instructions.

One such system using memory mapped I/O is the Digital Equipment Corporation pdp11 computer that is described in their publication entitled, *pdp11 handbook*, copyrighted 1969, which is incorporated herein by reference. In this system there are two types of device registers associated with each peripheral device: (1) control and status registers; and (2) data registers. In the pdp11 system, peripheral devices have one or more control and status registers which contain all the information necessary to communicate to the peripheral device. Among other things, these registers contain function bits which specify the type of operation that the peripheral device is to perform (such as read or write) and condition bits which indicate the status of the operation on the associated peripheral device (such as done, error or ready). In the pdp11 system, each peripheral device also has one or more data registers for temporarily storing data to be transferred into or out of the system. In general, in this system, loading one of the control and status registers associated with a peripheral device will initiate the transfer of data to the peripheral device as determined by the function bits.

Although this memory mapped I/O technique offers increased flexibility in input/output programming, it has the disadvantage that considerable amounts of logic may be required in order to implement the device registers so that the memory reference instructions used to manipulate the device registers can proceed normally without having to wait part way through the instruction execution for the peripheral device to receive or transmit the data in or to the device registers.

OBJECTS OF THE INVENTION

Accordingly, it is an object of the present invention to provide a system in which data is transferred across a peripheral interface using a memory mapping technique that permits a wide range of program instructions to be used in transferring information.

It is another object of the present invention to provide an interface that allows blocks of data to be transferred with a minimal number of program instructions being required to transfer each unit of data across the interface.

It is a further object of the present invention to provide an interface that allows for flexible program instruction loops to be written for driving the interface thus resulting in faster transfers of blocks of data.

It is a still further object of the present invention to provide a low cost peripheral interface.

This invention is pointed out with particularity in the appended claims. An understanding of the above and further objects and advantages of this invention can be obtained by referring to the following description taken in conjunction with the drawings.

SUMMARY OF THE INVENTION

An interface between a peripheral controller and a host system is memory maped such that transfers across the interface are done by the processor in the peripheral controller reading or writing to an address within the address space of the memory which normally contains the operand data operated on by the processor (i.e., to the processor the interface appears to be a memory location). Memory load and store instructions which address the predetermined memory location performed by the processor result in transfers across the peripheral interface. Upon detecting a memory read or write instruction which addresses the predetermined memory location, the interface logic faces the data bus transceivers in the appropriate direction and generates a strobe signal indicating that either data on the interface is valid (in the case of a memory write) or data is requested to be placed on the interface (in the case of a memory read). The host system responds with an acknowledge signal when either it has accepted the data (in the case of a memory write) or it placed data on the interface (in the case of a memory read). Between the initializing strobe signal and the responding acknowledge signal, the interface logic generates a wait state to the processor to allow for the response time required by the host system to accept or place data on the interface. A watch dog timer is provided to countdown wait states and will cause an abort of the transfer across the interface and interrupt the processor in the peripheral controller if a predetermined host system response time has been exceeded.

BRIEF DESCRIPTION OF THE DRAWINGS

The manner in which the method of the present invention is performed and the manner in which the apparatus of the present invention is constructed and its mode of operation can best be understood in light of the following detailed description together with the accompanying drawings in which like reference numbers identify like elements in the several figures and in which.

DESCRIPTION OF THE PREFERRED EMBODIMENT

Figure 1:
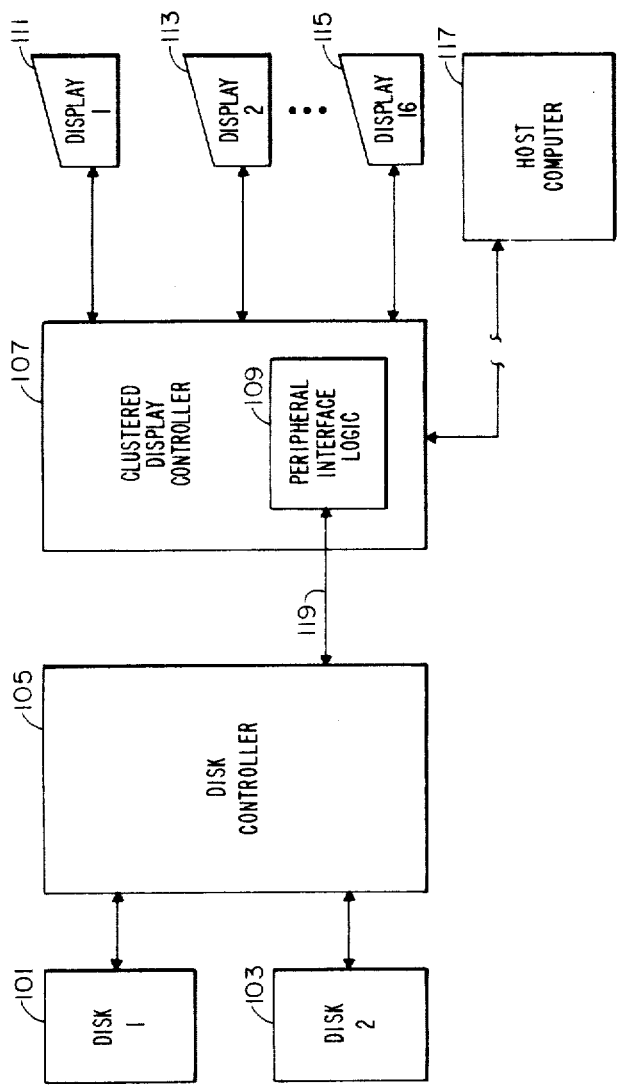
FIG. 1 is a block diagram of a clustered display controller system containing the present invention.

The method and apparatus of the present invention for addressing a peripheral interface by mapping into memory address space is incorporated into the disk controller of the system illustrated in FIG. 1. FIG. 1 illustrates a clustered display system capable of controlling up to 16 displays, display 1 111, display 2 113 through display 16 115. Displays 1 through 16 are connected to clustered display controller 107 such that data entered from a keyboard of the display may be transmitted via clustered display controller 107 to a host computer 117. Conversely, the data originated in host computer 117 may be displayed on displays 1 through 16 via display controller 107. Clustered display controller 107 may be located in relatively close proximity to host computer 117 or may be remotely located with transmission between the clustered display controller 107 and host computer 117 taking place over telephone lines connecting the two.

Disk controller 105 is coupled to clustered display controller 107 to provide local storage of information and programs used by the clustered display controller 107. The transfer of information to and from the disk controller 105 to clustered display controller 107 takes place via peripheral interface logic 109 within clustered display controller 107. In the preferred embodiment, disk controller 105 is capable of having one or two disk devices, disk 1 101 and disk 2 103. In the preferred embodiment, disk 1 101 and disk 2 103 may be configured as follows: a single Winchester type disk drive, one Winchester type disk drive and one floppy disk drive, or two floppy disk drives.

In the preferred embodiment, disk controller 105 is a microprocessor based controller which may be up to ten feet from the clustered display controller 107. Disk controller 105 does all of the data retrieval, read/write head positioning, and status updating required by the disk operating system software which is resident and executes in the clustered display controller 107. Communications between the clustered display controller 107 and disk controller 105 is done via by a byte parallel interface 119 which is protected by a parity bit. Peripheral interface logic 109 in clustered display controller 107 acts as an instruction decoder and a dual ported memory. An application program executing in the clustered display controller 107 may access a command area or a status area in the buffer memory of peripheral interface logic 109 as well as the data area. This dual ported memory is shared between disk controller 105 and the clustered display controller 107 and is the vehicle by which all but the most basic commands are passed to disk controller 105. Disk controller 105 periodically scans the dual ported memory in the peripheral interface logic 109 for new commands and updates the status accordingly.

Figure 2:
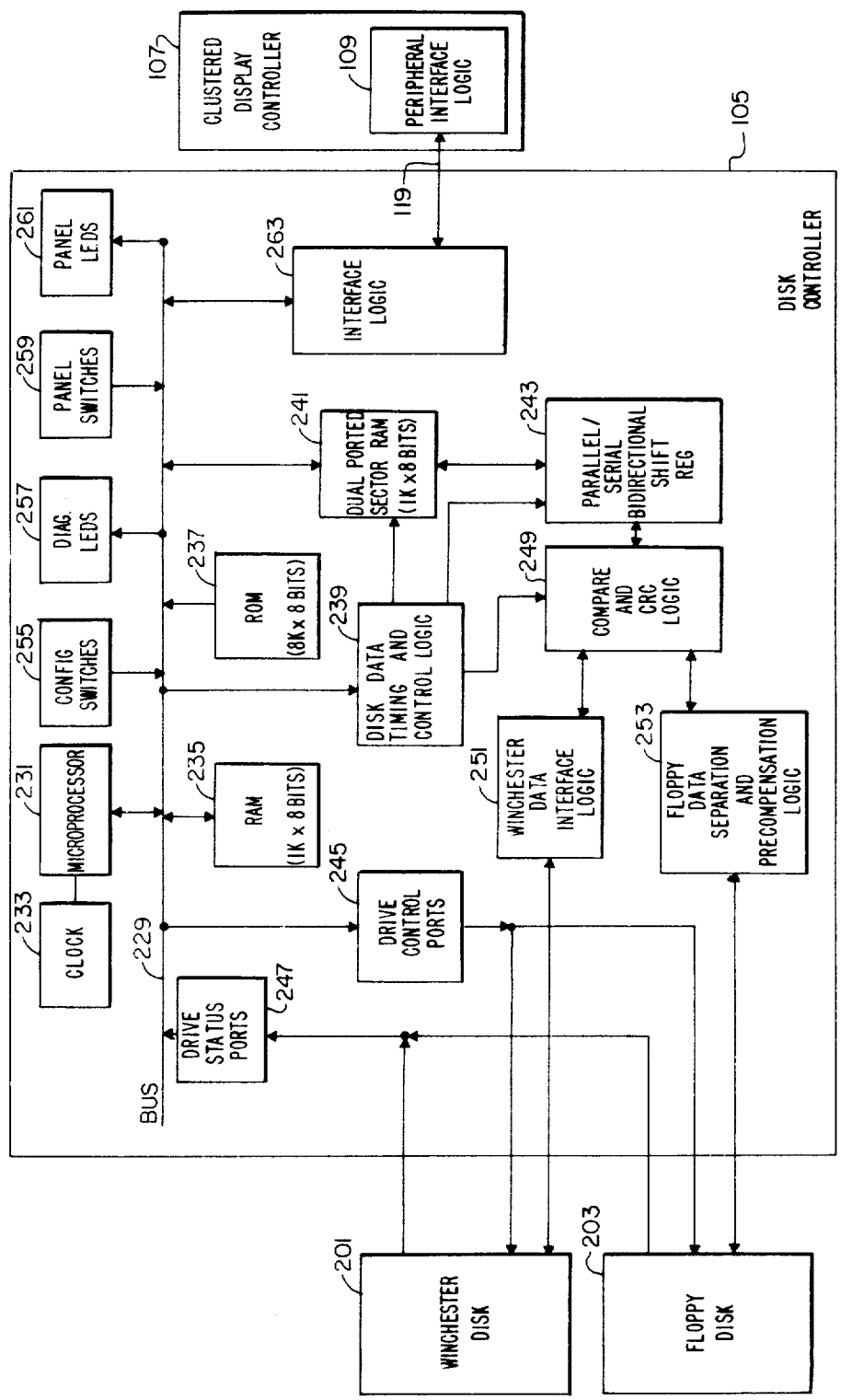
FIG. 2 is a logic block diagram of the disk controller of the system shown in FIG. 1.

Disk controller 105 will now be described in more detail with reference to FIG. 2. Microprocessor 231 controls all head positioning, data transfer and status functions to the disk drives attached to disk controller 105. In FIG. 2, disk drive 1 is shown as being an Winchester disk 201 and disk drive 2 is shown as being a floppy disk 203. Microprocessor 231, in addition to controlling disk 201 and 203, also controls the interface logic 263 which controls the transfer of commands and data between disk controller 105 and clustered display controller 107.

In the preferred embodiment, microprocessor 231 is an Intel 8085A microprocessor which is an 8-bit parallel central processing unit and is described in the Intel publication entitled, *MCS-80/85 Family User's Manual*, copyrighted 1979, which is incorporated herein by reference. Clock 233 is coupled to microprocessor 231 and provides the basic clock frequency utilized by microprocessor 231. Read only memory (ROM) 237 is an 8K (1K equals 1024) by eight bit memory which contains programs (or microprograms) executed bymicroprocessor 231. 2K of ROM 237 is used for diagnostic programs and the remaining 6K of ROM 237 is used for the disk controller operating system firmware.

Configuration switches 255 are manually set when the disk subsystem is configured to indicate the types of disk drives (Winchester or floppy disk) actually attached to the disk controller 105. Diagnostic light emitting diodes (LEDs) 257 are 8 diagnostic indicators that are used to indicate the status of the disk subsystem as determined by the execution of the diagnostic programs stored in ROM 237. Panel LEDs 261 are indicating lights located on the front panel which are used to indicate whether the disk subsystem is in a bootstrap mode, which of the two possible disk drive is selected and error conditions. Panel switches 259 are operator selectable switches which are used to write protect information stored on the disks, to indicate which of the two possible disk drives are to be used for bootstrapping the disk subsystem, and to reset the disk controller and cause the microprocessor 231 to begin executing the disk controller firmware at location 0.

Bus 229 represents the data, address and control busses which connect microprocessor 231 with other components of disk controller 105. Random access memory (RAM) 235 is a writable memory used as a workspace by the disk controller operating system firmware. This 1K by 8 bit memory is used to contain images of the control area found in the dual ported memory located in the peripheral interface logic 109 of the clustered display controller 107. Disk data timing and control logic 239 provides the timing and control of data going to or from disks 201 and 203. Dual ported sector RAM 241 is a 1K by 8 bit memory that is used to store sectors of disk data which are being written onto disk 201 or 203 or sectors of disk data read from disk 201 or 203. Dual ported sector RAM 241 is used as an intermediate storage of the disk data as it is transferred between clustered display controller 107 and disks 102 and 103.

Parallel/serial bidirectional shift register 243 is used to convert the data from 8 parallel bits to a serial bit stream as the data goes from dual ported sector RAM 241 to disks 201 and 203 and to convert it from a serial bit stream 8 parallel bits as the data comes from disks 201 and 203 and is stored in dual ported sector RAM 241. Comparator and CRC logic 249 is used to check and generate cyclic redundancy checks (CRC) characters as the data is transferred between the disk and the dual ported sector RAM 241 and also allows a comparison between the data stored in dual ported RAM 241 and the data from either disk 201 or 203. Winchester data interface logic 251 is the interface logic which contains differential drivers and receivers for data being written onto or being read from Winchester disk 201. Floppy data separation and precompensation logic 253 performs the data separation and precompensation functions required of data going to or from floppy disk 203 in either single or double density mode.

As discussed hereinbefore, disk 201 is illustrated in FIG. 2 as being a Winchester type disk and disk 203 is illustrated as being a floppy disk. In the preferred embodiment as described hereinbefore, disk controller 105 can be configured to have either a single Winchester disk and/or a single floppy disk or it can be configured to have two floppy disk drives. If two floppy disk drives are configured in the system, disk 201 would be the second floppy disk and, instead of being connected to Winchester data interface logic 251, it would be connected to floppy disk separation and precompensation logic 253.

Drive status ports 247 provide status information from disk drives 201 and 203 which consists of drive ready, track 0 detection, and write protection indicators. Drive control ports 245 contain logic associated with stepping the disk read/write heads, the write gate, the read gate, and in the case of the Winchester disk which can have up to 4 read/write heads, the selection of the read/write head.

Figure 3:
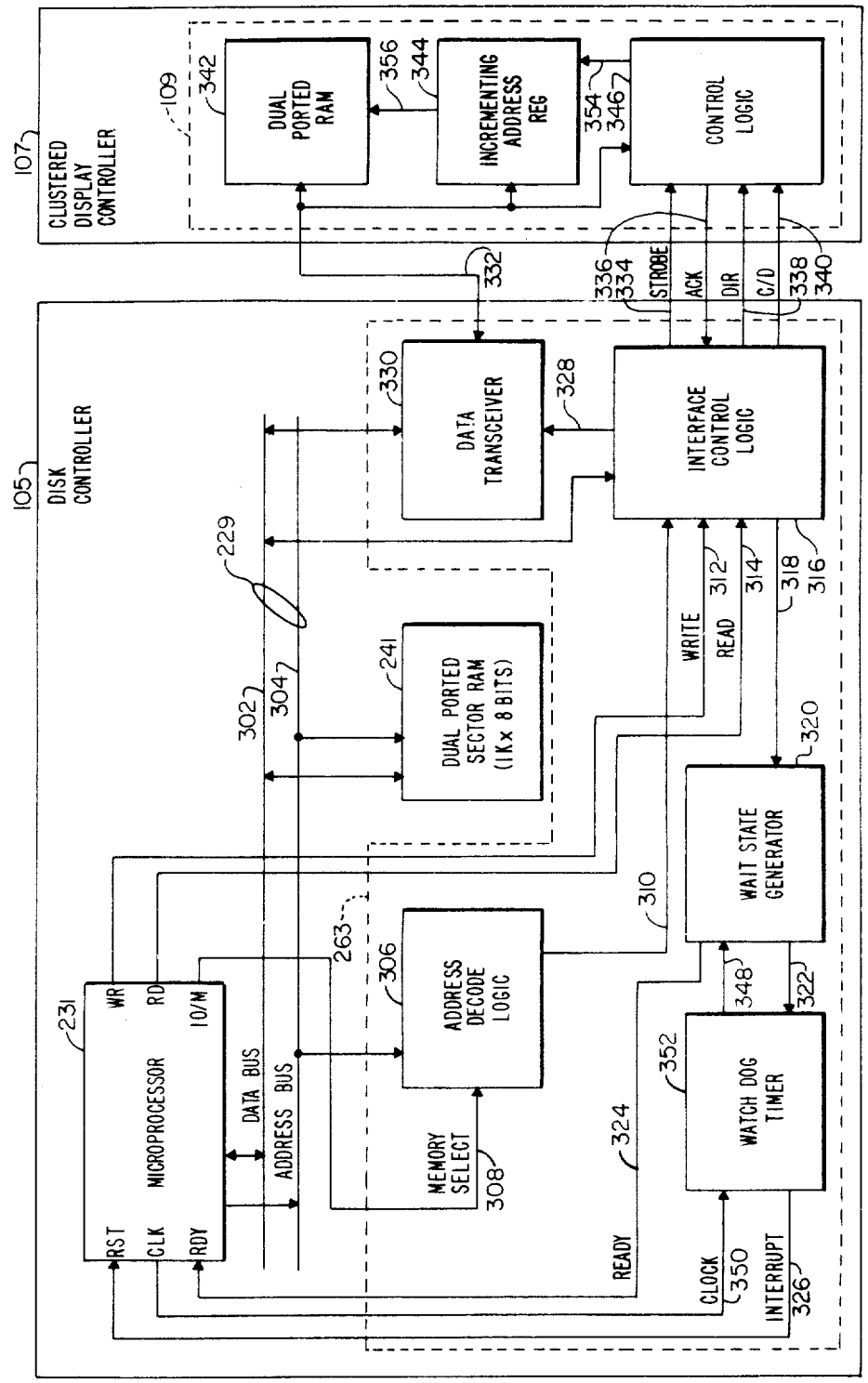
FIG. 3 is a more detailed logic block diagram of the system shown in FIGS. 1 and 2 and illustrates the present invention.

FIG. 3 illustrates in greater detail some of the logic illustrated in FIGS. 1 and 2. In particular, FIG. 3 illustrates interface logic 263 in greater detail. Interface logic 263 handles all the data and command transfers between the clustered display controller 107 and disk controller 105.

The present invention of addressing a peripheral interface by mapping into memory address space is performed by interface logic 263 as follows. When the microprocessor 231 wishes to transfer data to or from the clustered display controller 107 and more particularly to the peripheral interface logic 109 contained therein, the microprocessor 231 puts a predetermined memory address on the address bus 304. In the preferred embodiment, memory address FFFF (in hexidecimal notation, i.e., base 16) is used to address the peripheral interface. This address placed on address bus 304 is decoded by address decode logic 306 which when the predetermined memory address is decoded initiates the data transfer to the peripheral interface by placing a signal on line 310 which initiates the data transfer by interface control logic 316. If a write operation is to be done (i.e., a transfer from disk controller 105 to clustered display controller 107), interface control logic 316 will generate a signal on line 318 which causes wait state generator 320 to generate a signal on line 324 which will place microprocessor 231 in a wait state during a memory read or write cycle. During this wait state, microprocessor 231 will wait an integral number of clock cycles for the signal at the ready (RDY) input to change state before completing the read or write cycle. Interface control logic 316 will also generate a strobe signal on line 334 which will initiate the transfer of data between transceivers 330 and RAM 342 over lines 332. The strobe signal on line 334 is generated in response to interface control logic receiving either a write signal on line 312 from microprocessor 231 write (WR) output indicating data on data bus 302 is to be written into the selected memory location or I/O device or a read signal on line 314 from microprocessor 231 read (RD) output indicating that the selected memory location or I/O device is to be read and that data bus 302 is available for the data transfer. When the data has been written into RAM 342, control logic 346 will generate an acknowledge (ACK) signal on line 336 which informs interface control logic 316 that the transfer has been completed. When the acknowledge signal is received by interface control logic 316, a signal is generated on line 318 to inhibit wait state generator 320 such that the signal line 234 to microprocessor 231 is put in the ready state which allows the microprocessor 231 to exit the wait state to complete the read or write cycle and proceed to execute the disk controller firmware by executing the next microprogram instruction.

When a transfer is initiated between disk controller 105 and clustered display controller 107, the signal received on line 318 from interface control logics 316 initializes a counter within watch dog timer 352 to a predetermined value. This predetermined value to which the counter is initialized is such that, under normal operations, the transfer between disk controller 105 and clustered display controller 107 will be completed before the counter is counted down to zero and thereby times out. This counter in watch dog timer 352 is initialized when the strobe signal is generated on line 334. The counter counts down by one each time it receives a clocking signal received from microprocessor 231 clock (CLK) output on line 350. If the counter in watch dog timer 352 does time out, it signals wait state generator 320 on line 348 which in turn changes the state of ready signal on line 324 which is input to the microprocessor 231 and takes the microprocessor out of the wait state so that it can respond to the interrupt request generated by watch dog timer 352 generating an interrupt signal on line 326 which is received by a microprocessor 231 restart interrupt (RST) input. Thus, as long as the strobe signal on line 334 is active, which is during the time that interface logic 316 is waiting for the acknowledge signal on line 336, a signal on line 322 will be in the enable state enabling watch dog timer 352 to time out if the strobe signal on line 334 does not go inactive during a predetermined number of microprocessor 231 clock cycles which is controlled by watch dog timer 352. If the acknowledge signal on line 336 from control logic 346 does not indicate that the transfer has been completed during the predetermined amount of time, then the watch dog timer 352 will time out causing an interrupt signal on line 326 to be generated which will interrupt the microprocessor 231. If this time out occurs, and the microprocessor 231 is interrupted, the watch dog timer will also reset wait state generator 320 by a signal on line 348. The resetting of wait state generator 320 also causes the wait state generator to reset the ready signal on line 324 so that the microprocessor will be in the ready state and ready to process the interrupts received from line 326.

The disk controller operating system is programmed such that when the microprocessor is interrupted, the firmware will determine what was the cause of the interrupt. In this case, it will be the time out during a data transfer between disk controller 105 and clustered display controller 107 and the firmware will flag this error condition by illuminated a machine error indicator light in panel LEDs 261 (see FIG. 2) and also put an error into the diagnostic indicator lights which are diagnostic LEDs 257 (see FIG. 2) which indicates the type of error which has occured.

The operation of the logic illustrated in FIG. 3 will now be discussed in conjunction with the execution of the microprocessor program found in Table 1 below. The program in Table 1 is written to transfer a block of 256 bytes of information from dual ported sector RAM 241 of disk controller 105 to RAM 342 in clustered display controller 107 which is contained in peripheral interface logic 109. This process of transferring data either to or from disk controller 105 to clustered display controller 107 is done under the control of the microprogram executing in disk controller 105. The program that does these transfers performs two steps. During the first step the logic within the peripheral interface logic 109 is initialized under the control of the disk controller 105 and then a loop within the microprogram is executed which transfers the block of words between the disk controller 105 and the clustered display controller 107.

This first step of initializing the peripheral interface logic 109 can be further broken down into substeps. During the first substep, the microprogram executing in disk controller 105 conditions control logic 346 to accept a DMA (direct memory access) select byte and during the second substep, the address of the first location of a 256 byte block in RAM 342 is transferred into incrementing address register 344. Once this initialization has taken place, the microprogram then proceeds with the loop which transfers one byte of data at a time from or to dual ported sector RAM 241 to or from RAM 342. The direction of the transfer depends upon whether data is being transferred from a disk connected to disk controller 105 to clustered display controller 107 or from clustered display controller 107 to a disk connected to disk controller 105.

Now in reference to Table 1, the microprogram will be explained in greater detail. The first instruction loads the accumulator (AC) of the microprocessor 231 with a bit pattern which when transferred to interface control logic 316 will set direction line 338 to the state which indicates the direction of data interchange between interface control logic 316 and control logic 346 and will also set control/data (C/D) line 340 to the control state. The second instruction outputs the data in the accumulator onto data bus 302 with an I/O device address of 40 appearing on address bus 304. Address decode logic 306 recognizes this as being an output operation directed to interface control logic 316 by the state of the memory select signal on line 308 from microprocessor 231 I/O or memory (IO/M) signal output and signals control interface logic 316 on line 310 to set direction line 338 and control/data line 340 depending upon the status of the corresponding data bits on data bus 302. It should be noted that data bus 302 is an 8 bit (byte) bus and that address bus 304 is a 16 bit address bus as illustrated in FIG. 3.

In actuality, the Intel 8085A microprocessor has an 8 bit address bus on which the 8 most significant bits of the 16 bit address appear and an 8 bit multiplexed address/data bus on which the least significant 8 bits of an address appear during a first clock cycle of the microprocessor and on which 8 bits of data appear during a second and third clock cycle of the microprocessor. This multiplexing has been ignored in FIG. 3 for simplicity sake with the address bus 304 being illustrated as a 16 bit address bus.

The third instruction loads the accumulator with the DMA select byte. The DMA select byte determines whether a read or a write operation of data is to be performed and when transmitted to the peripheral interface logic 109 conditions the logic to either receive or transmit a block of information to or from RAM 342. In the current example, a write operation is being performed and data will be transferred from RAM 241 into RAM 342. The fourth instruction stores the accumulator into location FFFF (base 16). Address FFFF has been chosen as the address which will be decoded to indicate that the transfer is not to actually take place into dual ported sector RAM 241 but instead the information is to be transferred to the peripheral interface. Therefore, whenever the address decode logic 306 detects address FFFF on address bus 304 and memory select signal on line 308 indicates that a memory operation is taking place, address decode logic 306 signals interface control logic 316 by line 310 that the data that will appear on data bus 302 is to be transferred to clustered display controller 107. Therefore, when the DMA select byte appears on data bus 302 as signaled by the write signal on line 312, interface control logic 316 will generate the strobe signal on line 344 and wait for the acknowledge signal back on line 336 and the DMA select byte will be transferred via data transceivers 330 and lines 332 into control logic 346 and condition control logic 346 to perform a DMA block transfer.

Having transmitted one byte of control information from disk controller 105 to clustered display controller 107, the logic in disk controller 105 and display controller 107 is now conditioned to transmit and receive multiple bytes of data. This conditioning to transmit and receive data is done by instruction 5 loading the accumulator with a bit pattern to continue to set the direction line 338 to the out direction (i.e., a transfer from disk controller 105 to clustered display controller 107) and to set the control/data line 340 to the data state. Having loaded the data-out bit pattern into the accumulator, instruction 6 is executed by microprocessor 231 which performs an output to I/O port 40 which sets the status of lines 338 and 340 to correspond to the bit pattern received from the data bus 302. The setting of lines 338 and 340 to the out and data states conditions control logic 346 to receive data from data transceiver 330 via lines 332.

Instruction 7 loads the accumulator with the most significant byte (MSB) of the sixteen bit address which corresponds to the first location in RAM 342 which is to receive the first byte of the 256 bytes of data to be transferred from RAM 241 to RAM 342. Instruction 8 stores the most significant byte of the address into location FFFF which address gets decoded by address decode logic 306 which in turn signals interface logic 316 by line 310 to generate a strobe on line 334 in response to the write signal on line 312 and which further conditions data transceiver 328 to take the data from data bus 302 and transmit it by lines 332 to the incrementing address register 344 where the most significant byte of the 16 bit address is stored in an incrementing register. Instruction 9 loads the least significant byte (LSB) of the 16 bit address into the accumulator and instruction 10 by doing a store to address FFFF transmits the least significant byte of the address into incrementing address register 344 thus completing the loading of the incrementing register with the full 16 bit address of the beginning location in RAM 342 which is to receive the first byte of the 256 byte block of information to be transmitted from RAM 241 to RAM 342.

Control logic 346 is designed such that the first two bytes of information received after receiving a DMA select byte are treated as the most significant and least significant bytes of a 16 bit address and are stored in incrementing address register 344. All further bytes of information received on line 332 after these first two bytes of address information will be stored in RAM 342 during a write operation (the type of operation being specified by the DMA select byte indicating a read or write operation). If the DMA select byte indicates a read operation is to be performed, after the first two bytes of address information are stored into incrementing address register 344, bytes of information will be read from RAM 342 and transmitted to data transceivers 330 over lines 322 each time a strobe is received on line 334 from interface control logic 316.

Continuing now with the example write operation, instructions 11, 12 and 13 initialize the program loop which will do the actual transfer of the 256 bytes of data from RAM 241 to RAM 342. Instruction 11 loads an index register in microprocessor 231 with the address of the first location in RAM 241 which contains the first byte of the disk sector which is to be transferred to RAM 342. Instruction 12 loads the accumulator with the count of the bytes in the sector which are to be transmitted from RAM 241 to RAM 342 (in the example case is considered to be a sector of 256 bytes). Instruction 13 stores this count of the bytes in the block into a memory location which is used as a countdown counter.

Having initialized the transfer loop, the loop within the microprogram which will do the actual transfer of the 256 bytes of data from RAM 241 to RAM 342 is now entered. Instruction 14 loads the accumulator with a byte of data from dual ported sector RAM 241. The data byte loaded into the accumulator from RAM 241 is determined by the address specified in the index register which was initialized by instruction 11 above. Instruction 15 stores the data byte into location FFFF which, as we saw above, gets decoded by address decode logic 306 and conditions interface control logic 316 to generate a strobe on line 344 and wait for an acknowledge on line 336 and also conditions data transceivers 330 via line 328 such that the data byte that appears on data bus 302 will be transferred via lines 332 into RAM 342. The data byte from lines 322 is stored into the location specified by incrementing address register 344 which appears on lines 356. Once the data byte is received, control logic 346 signals incrementing address register 344 via line 354 to increment the address such that the next byte of data received will be stored into the next location in RAM 342.

Having transmitted one byte of data from RAM 241 to RAM 342, in instruction 16 the microprogram increments the index register to the next location in RAM 241 which contains the next byte of data to be transmitted. Instruction 17 then decrements the byte block counter to indicate the number of bytes remaining to be transferred to the block. Instruction 18 then does a jump back to instruction 14 if the counter is not zero, thus indicating that more bytes of data remain to be transferred from RAM 241 to RAM 342. If the counter is zero, indicating that all bytes have transferred, the microprogram then will go on to check if any parity errors occurred during the transmission of the block. If a parity error did occur, the program is designed to attempt to retransmit the block unless the number of retries has been exhausted.

TABLE 1

Microprogram to transfer 256 bytes of data from dual ported sector RAM 241 to RAM 342 (i.e., a transfer of 1 sector of data read from a disk to clustered display controller 107).

| Instruction No. | Instruction | Operand | Comment |
| --- | --- | --- | --- |
| 1 | LDA | CNTOUT | Load AC with pattern to set control/data line 340 to control and direction line 338 to out. |
| 2 | OUT | PORT40 | Send AC to I/O port 40 setting lines 338 and 340. |
| 3 | LDA | DMASEL | Load AC with DMA write select byte. |
| 4 | STA | FFFF | Store DMA select byte on data bus 302 into control logic 346 via data transceivers 330 and lines 332. |
| 5 | LDA | DATOUT | Load AC with pattern to set control/data line 340 to data and direction line 338 to out. |
| 6 | OUT | PORT40 | Send AC to I/O port 40 setting lines 338 and 340. |
| 7 | LDA | MSBDMA | Load AC with MSB of beginning location in RAM 342. |
| 8 | STA | FFFF | Store MSB of address in incrementing address register 344 via data transceiver 330 and lines 332. |
| 9 | LDA | LSBDMA | Load AC with LSB of beginning location in RAM 342. |
| 10 | STA | FFFF | Store LSB of address in incrementing address register 344 via data transceiver 330 and lines 332. Initialize loop to transfer 256 bytes from RAM 241 to RAM 342 by initializing index and loop counters. |
| 11 | LXI | B,FIRST | Load index register with address of first location in RAM 241 to be transferred to RAM 342. |
| 12 | LDA | C256 | Load AC with count of number of bytes (256) in block to be transferred. |
| 13 | STA | CONTR | Store in block byte counter. |
| 14 LOOP | LDAX | B | Load AC with data byte from dual ported sector RAM 241. |
| 15 | STA | FFFF | Store data byte in RAM 342 at location specified by incrementing address register 344. |
| 16 | INX | B | Increment address to next data byte in dual ported sector RAM 241. |
| 17 | DCR | CONTR | Decrement byte block counter to indicate number of bytes remaining to be transferred. |
| 18 | JNZ | LOOP | If counter is not zero, loop back for next byte to be transferred until 256 bytes have been transferred. Check for any parity errors. If error, retransmit block unless number of retries has been exhausted. |

The above example microprogram was of a transfer of a block of 256 bytes of data from dual ported sector RAM 241 to RAM 342. A similar sequence of operation is followed for a read operation in which information is transferred from RAM 342 to dual ported sector RAM 241. If a read operation is to be performed, the microprogram in Table 1 would be changed such that instruction 3 would load a DMA select byte which would indicate that a read operation was to be performed as opposed to a write operation. Further, instruction 14 would be an instruction which would load the accumulator from location FFFF (LDA FFFF) and instruction 15 would be a store indirect on the index register (STAX B).

From the above description, it can be appreciated that whenever a transfer of either control or data information takes place between interface logic 236 and peripheral interface logic 109, a strobe and acknowledge sequence takes place via lines 334 and 336. The strobe signal on line 334 indicates that there is data on lines 332 from data bus 302 during a write operation or that data transceivers 330 are ready to receive data from lines 332 and place it onto data bus 302 during a read operation. Control logic 346 generates the acknowledge signal on line 336 during a write operation when it has received the data from lines 332 or, during a read operation, when it has placed data on lines 332.

During either read or write operations, interface control logic 316 generates a strobe on line 334 in response to address decoder logic 306 decoding an address of FFFF address bus 304 when line 308 indicates that a memory operation is being performed or address decoder logic 306 decoding and address of 40 from address bus 304 when line 308 indicates that and I/O operation is being performed and when the write signal on line 312 or the read signal on line 314 indicates the data bus 302 is ready. At this time, interface control logic 316 signals wait state generator 320 via line 318 to place microprocessor 231 into a wait state via a signal on line 324. Wait state generator 320 in turn enables watch dog timer 352 via line 322. Watch dog timer 352 counts the number of microprocessor clock cycles which appear on line 350 and if a predetermined number of cycles elapse before the acknowledge signal is received by interface control logic 316 on line 336, watch dog timer 352 will interrupt microprocessor 231 via line 326. If this number of microprocessor cycles is exceeded, the number being chosen such that it is greater than the normal response time that is required for a transfer between interface logic 263 and peripheral interface logic 109, watch dog timer 352 resets wait state generator 320 via a signal on line 348 such that microprocessor 231 will be in the ready state and ready to respond to the interrupt generated by the signal on line 326.

Although the preferred embodiment has been described primarily in terms of a transfer of data from a memory on one side of the interface to a memory on the other side of the interface, the transfer could involve one or no memory and be, for example, directly from a peripheral device to a communications line.

Although the above discussion has been in terms of using microprogram instructions which do a load or store of the accumulator from or to memory (i.e., LDA or STA type instructions), the present invention is equally applicable if other types of instructions that perform memory reads or writes are used thus allowing flexibility in programming transfers across the interface. Further, this invention is applicable to allow any processing unit, be it a microprocessor or other type or processor, to address an interface. Still further, the processing unit need not be in the peripheral controller but can be on either side of the interface, it being the case that the side of the interface with the processor is the master of information transfers across the interface.

While the invention has been shown and described with reference to the preferred embodiment thereof, it will be understood by those skilled in the art that the above and other changes in form and detail may be made therein without departing from the spirit and scope of the invention.

What is claimed is:

1. An apparatus for transferring information across an interface between a first subsystem and a second subsystem of a system, wherein said first subsystem includes a programmable processor and a memory, said processor capable of executing memory reference instructions which reference by a memory address data stored in said memory, said apparatus comprising:
   A. address decoding means coupled to said processor, said address decoding means for detecting said memory address of said memory reference instructions which address a predetermined memory location in said memory;
   B. interface control means coupled to said address decoding means and said processor, said interface control means responsive to said address decoding means when said address decoding means detects said memory reference instruction being executed which addresses said predetermined memory location for generating a strobe signal to said second subsystem and for receiving an acknowledge signal from said second subsystem;
   C. a wait means coupled to said interface control means and said processor, said wait means responsive to said interface control means for generating a wait signal to place said processor in a wait state at the time said interface control means generates said strobe signal and for removing said processor from said wait state upon receipt of said acknowledge signal by said interface control means from said second subsystem; and
   D. transceiver means coupled to said interface control means, said processor and said second subsystem, said transceiver means for receiving data from said processor during the execution of said write memory reference instruction and transmitting the data to said second subsystem and for receiving data from said second subsystem and transmitting the data to said processor during the execution of said read memory reference instruction whereby said first subsystem can transfer information to or from said second subsystem by said processor executing memory reference instructions addressing said predetermied memory locations thereby effectively mapping said interface into the address space of said memory.

2. The apparatus as claimed in claim 1 wherein said wait means further includes a watch dog timer means coupled to said processor, said watch dog timer means for counting a predetermined number of processor clock cycles which occur after said strobe signal is generated by said interface control means but before said interface control means receives said acknowledge signal from said second subsystem, said watch dog timer means for generating an interrupt to said processor if said predetermined number of clock cycles is exceeded before said watch dog timer means is reset in response to said wait means receiving a completion signal from said interface control means.

3. The apparatus as in claim 2 wherein said wait means further includes reset means for resetting said wait signal in response to a timeout signal from said watch dog timer means indicating that said predetermined number of clock cycles has elapsed or a transfer complete signal from said interface control means indicating that said interface control means has received said acknowledge signal from said second subsystem whereby said processor can complete the execution of the memory reference instruction which caused the data to be transmitted across said interface.

4. The apparatus as in claim 1 wherein said first said subsystem further comprises an address bus and a data bus and wherein said address bus is coupled to said processor, said memory and said address decoding means and wherein said data bus is coupled to said processor, said memory, said transceiver means, and said interface control means.

5. The apparatus as in claim 1 wherein said processor is a microprocessor.

6. The apparatus as in claim 1 wherein said memory is a dual ported memory.

7. The apparatus as in claim 1 wherein first said subsystem is a peripheral controller and said second subsystem is a host data processing system.

8. The apparatus as in claim 1 wherein said first subsystem is a host data processing system and wherein said second subsystem is a peripheral controller.

9. The apparatus as in claim 1 wherein second said subsystem comprises a second memory, an incrementing address register means, and a control means, said second memory coupled to said incrementing address register means, said incrementing address means coupled to said control means, said transceiver means coupled to said second memory, said incrementing address register means and said control means, said control means coupled to said interface control means, said second memory for receiving or transmitting data from or to said transceiver means, said incrementing address register means for specifying the location in said second memory where said information is to be read from or written into said second memory, said control means for indicating to said incrementing address register means when to increment an address stored in said incrementing address register means, said control means for generating said acknowledge signal to said interface control means when said information has been received from or transmitted to said transceiver means in response to said control means receiving said strobe signal from said interface control means.

10. The apparatus as in claim 9 wherein said address decoding means further includes means for detecting an input/output instruction which addresses a predetermined input/output port and wherein said interface control means further includes means for setting the state of control lines coupled to said second subsystem and said interface control means to a state as determined by bits of data receiving from said processor.

11. A method for transferring information across an interface between a first subsystem and a second subsystem of a system, wherein said first subsystem includes a programmable processor, an interface control means and a memory, said processor capable of executing memory reference instructions which reference data stored in said memory by a memory address, said method comprising the steps of:
 1. detecting the execution of a memory reference instruction which addresses a predetermined memory location in said memory by use of an address decoding means coupled to said processor;
 2. indicating to said second subsystem whether data is to be transmitted from said first subsystem to said second subsystem or from second subsystem to said first subsystem as a function of whether a write or a read memory reference instruction is being executed by said processor;
 3. generating a strobe signal to said second subsystem in response to said address decoding means detecting the execution of said memory reference instruction which addresses said predetermined memory location; 4. placing said processor in a wait state in response to a wait signal received from said interface control means when said interface control means generates said strobe signal;
 5. waiting for receipt of an acknowledge signal from said second subsystem by said interface control means, said acknowledge signal being generated by said second subsystem in response to said second subsystem receiving data from or transmitting data to said first subsystem;
 6. transmitting data from said processor to said second subsystem across said interface if said write memory reference instruction is being executed by said processor;
 7. receiving information from said second subsystem and transferring it to said processor if said read memory reference instruction is being executed by said processor upon receipt of said acknowledge signal from said second subsystem;
 8. removing said processor from said wait state upon receipt by said interface control means of said acknowledge signal from said second subsystem; and
 9. continuing the execution of said processor memory reference instructions whereby said first subsystem can transfer information to or from second subsystem by said processor executing memory reference instructions addressing said predetermined memory locations thereby effectively mapping said interface into the address space of said memory.

12. The method of claim 11 wherein during step 5 while waiting for said acknowledge signal from said second subsystem, a timing operation is performed which counts the number of processor clock cycles which have elapsed since the generation of said strobe signal and wherein if the number of clock cycles exceeds a predetermined number an interrupt is generated to said processor and said processor is removed from said wait state to enable processing of said interrupt by said processor.

13. A method for transferring information across an interface between a first subsystem and a second subsystem of a system wherein said first subsystem includes a programmable processor and a first memory, said processor capable of executing memory reference instructions which reference data stored in said first memory by a memory address, said method comprising the steps of:
 1. setting a control/data line to a control state and a direction line to an out state by executing an I/O instruction to a predetermined I/O port address;
 2. sending a direct memory access select information to said second subsystem by referencing a predetermined memory location in said first memory;
 3. setting said control/data line to a data state and said direction line to the out state by executing an input/output operation to said predetermined I/O port address;
 4. sending the address of a first location of a block of memory locations in a second memory contained in said second subsystem to said second subsystem by executing a memory reference instruction addressing said predetermined memory address;
5. initializing a pointer to a first location in said first memory;
6. loading a counter with a count of the number of units of data to be transferred between said first subsystem and said second subsystem;
7. if a write operation is to be performed from said first subsystem to said second subsystem, accessing the next unit of data in the said first memory and executing a memory reference instruction addressing said predetermined memory location or, if a read operation is to be performed from said second subsystem to said first subsystem, executing a memory reference instruction addressing said predetermined memory location and writing said received unit of data into the next memory location addressed by said pointer to said first memory;
8. incrementing said pointer;
9. decrementing the count of the number of units of data to be transferred;
10. returning to step 7, if all units of data have not been transferred between said first subsystem and second subsystem; and
11. continuing, if all units of data have been transferred;

whereby said first subsystem can transfer information to or from said second subsystem by said processor executing memory reference instructions addressing said predetermined memory locations thereby effectively mapping said interface into the address space of said first memory.

* * * * *